US009431856B2

(12) United States Patent
Simon et al.

(10) Patent No.: US 9,431,856 B2
(45) Date of Patent: Aug. 30, 2016

(54) POWER TRANSMISSION

(71) Applicant: Pabellon, Inc., Richmond, CA (US)

(72) Inventors: Michael Simon, Morgan Hill, CA (US); Alejandro Victorio Rubin, Gilroy, CA (US)

(73) Assignee: Pabellon, Inc., Richmond, CA (US)

( * ) Notice: Subject to any disclaimer, the term of this patent is extended or adjusted under 35 U.S.C. 154(b) by 677 days.

(21) Appl. No.: 13/718,238

(22) Filed: Dec. 18, 2012

(65) Prior Publication Data

US 2013/0175872 A1 Jul. 11, 2013

Related U.S. Application Data

(60) Provisional application No. 61/631,633, filed on Jan. 9, 2012.

(51) Int. Cl.

| | |
|---|---|
| ***H01F 27/42*** | (2006.01) |
| ***H02J 17/00*** | (2006.01) |
| ***H02J 5/00*** | (2016.01) |
| ***H01F 38/14*** | (2006.01) |
| *H01F 27/28* | (2006.01) |

(52) U.S. Cl.

CPC ............... *H02J 17/00* (2013.01); *H01F 38/14* (2013.01); *H02J 5/005* (2013.01); *H01F 27/2804* (2013.01)

(58) Field of Classification Search

USPC .................................................... 307/104, 19

See application file for complete search history.

(56) References Cited

U.S. PATENT DOCUMENTS 4,633,205 A * 12/1986 Jones ...................... H01P 1/218 333/219.2
4,724,389 A * 2/1988 Hyde .................. G01R 33/343 324/316
8,169,185 B2 * 5/2012 Partovi .................. H01F 5/003 320/108
8,610,311 B1 * 12/2013 Grimes ......................... 307/104
8,716,900 B2 * 5/2014 Kanno .................... H01F 38/14 307/104
9,071,085 B2 * 6/2015 Kim et al.
2005/0189910 A1 9/2005 Hui
2007/0279002 A1 12/2007 Partovi et al.

(Continued)

FOREIGN PATENT DOCUMENTS

EP 2 555 377 A1 2/2013
EP 2 642 497 A1 9/2013

(Continued)

OTHER PUBLICATIONS

Ingrid Kardinal, Extended European Search Report, mailed Aug. 12, 2015.

*Primary Examiner* — Ronald W Leja
(74) *Attorney, Agent, or Firm* — Gard & Kaslow LLP

(57) ABSTRACT

An improved device and system for power transmission. A power transmission device comprises a primary winding magnetically coupled to a resonant secondary which comprises a plurality of magnetic resonators, each magnetic resonator comprising a magnetic winding. The magnetic resonators are connected in series and arranged so that the magnetic axis of each magnetic resonator is coupled to the primary winding. In operation, a power source supplies alternating current at an operating frequency to the primary of a power transmission device used as a transmitter. A load is coupled to the primary of a power transmission device used as a receiver. Collectors may be coupled to either or both of the transmit or receive device. A return line may be coupled to either or both of the transmit or receive device.

38 Claims, 9 Drawing Sheets

100c
110c
112c
114c
120c
122c
124c
128c
130c
140c

(56) References Cited

U.S. PATENT DOCUMENTS

2008/0067874 A1 3/2008 Tseng
2009/0096413 A1 4/2009 Partovi et al.
2010/0033021 A1* 2/2010 Bennett ........................ 307/104
2010/0052431 A1 3/2010 Mita
2010/0265159 A1 10/2010 Ando et al.
2010/0277120 A1* 11/2010 Cook et al. .................. 320/108
2010/0301678 A1 12/2010 Kim et al.
2011/0156492 A1 6/2011 Ryu et al.
2011/0156635 A1* 6/2011 Hong et al. .................. 320/107
2011/0193421 A1 8/2011 Urano
2011/0241437 A1 10/2011 Kanno
2011/0266880 A1* 11/2011 Kim et al. ................... 307/104
2012/0112531 A1* 5/2012 Kesler .................. B60L 11/182 307/9.1
2012/0161539 A1* 6/2012 Kim et al. ................... 307/104
2012/0193996 A1* 8/2012 Ryu et al. .................... 307/104
2012/0235508 A1* 9/2012 Ichikawa ..................... 307/104
2012/0313577 A1* 12/2012 Moes et al. .................. 320/108
2013/0009488 A1 1/2013 Choe
2013/0026850 A1* 1/2013 Throngnumchai ... B60L 11/182 307/104
2013/0175872 A1* 7/2013 Simon et al. ................ 307/104
2013/0278075 A1* 10/2013 Kurs et al. ................... 307/104
2014/0361628 A1* 12/2014 Huang et al. ................ 307/104

FOREIGN PATENT DOCUMENTS

WO 2011/083594 A1 7/2011
WO 2011/122249 A1 10/2011
WO 2011/135424 A2 11/2011
WO 2012/067184 A1 5/2012

* cited by examiner

POWER TRANSMISSION

CROSS-REFERENCE TO RELATED APPLICATIONS

This application claims priority to U.S. Provisional Patent Application No. 61/631,633, entitled "Pabellon effect wireless power transfer using electronically small resonant elements for near field tunneling" and filed Jan. 9, 2012, the disclosure of which is incorporated herein by reference.

BACKGROUND

1. Field of the Invention

The present invention relates generally to electromagnetic power transmission.

2. Description of the Prior Art

The goal of electric power transmission is the efficient transfer of power over distance. Improvements to power transmission look to improving efficiency, distance, or both.

Electromagnetic power transmission transfers power between a power transmitting device such as a transmit coil, and a power receiving device such as a receive coil or winding, through the use of inductively coupled magnetic fields. Power from an alternating current source is applied to the transmit coil, creating a magnetic field. This magnetic field induces a magnetic field in the receive coil, generating an alternating current in the second coil which is supplied to a load.

Magnetic power transfer according to the art may be characterized by the type of coupling between the power transmitting device and the power receiving device. The three broad categories of such coupling are: transformer coupling, inductive coupling, and resonant inductive coupling. An important aspect of each type of coupling is the distance between power transmitting and power receiving devices over which power transfer is efficient In transformer coupling, the transmit and receive coils are mounted close together. In the case of transformers, transmit and receive coils are commonly referred to as primary and secondary. At low frequencies, for example 20 to 20,000 Hertz (Hz) in audio use, transformers use magnetic materials such as iron, steel, or ferrites for cores. An example of such a transformer would be the output transformer in a vacuum tube guitar amplifier. In such a transformer, the primary and secondary windings are placed on a laminated steel core, with one winding wound on top of the other, thus providing tight magnetic coupling between primary and secondary windings. Air-core transformers are used for higher frequencies. An example of an air-core transformer is an intermediate-frequency (IF) transformer used in radio or television equipment. Primary and secondary windings are wound millimeters apart on a common nonmagnetic bobbin or form providing a common axis, again providing tight magnetic coupling.

Inductive coupling may be thought of as a transformer with separate primary and secondary windings which do not necessarily share a common core. Examples of inductive coupling include devices such as rechargeable electric toothbrushes and devices adapted to use charging mats. In a rechargeable electric toothbrush, the transmit coil is mounted in a base unit into which the electric toothbrush body is inserted; the electric toothbrush body contains the receive coil which recovers power from the magnetic field produced by the transmit coil. Power from the receive coil in the form of alternating current is converted to direct current to recharge a battery in the electric toothbrush. In charging mats, such as the Duracell Powermat®, the mat contains the transmit coil which produces a varying magnetic field. Devices to be charged, such as phones or other handheld devices must be adapted for charging, such as by designing the device with a receive coil and other circuitry for using the charging mat, or through adding an accessory such as a case containing the receive coil and charging circuitry which converts the alternating current from the receive coil to direct current for charging the device. The device to be charged must be placed directly on to the charging mat for charging to take place. For inductive coupling, the two coils must be close together, in the millimeter to centimeter range, for efficient power transfer.

In resonant coupling, the transmit coil is configured to resonate at a chosen frequency, and alternating current is fed to the coil at this frequency. The transmit coil may be self-resonant, where the inductance and self-capacitance of the coil set the resonant frequency, or the coil may be made resonant by adding a capacitor in series or in parallel with the coil. When driven at the resonant frequency, a coil is said to ring, generating an increasing oscillating magnetic field. If both transmit and receive coils are resonant, they must be carefully tuned to be resonant at the same frequency. Resonant inductive coupling can transfer power over what is considered the electromagnetic near field, defined in terms of the wavelength ($\lambda$) of the operating resonant frequency, and in the range of the wavelength divided by two Pi ($\lambda/2\pi$). Even in this near field, efficiency in resonant inductive coupling falls off at a rate proportional to one over the distance between transmitter and receiver to the fourth power.

To increase the efficiency of resonant inductive coupling, losses in the coils are to be minimized. Common methods to reduce such losses include using air core coils to eliminate losses from magnetic cores, and using physically large coils with a small number of turns to reduce resistive losses. This higher efficiency, measured electrically as the Quality factor or "Q" of a tuned circuit, results in a smaller bandwidth, or operating frequency range; the higher the "Q", the narrower the bandwidth. Such coils, when operating in the one to fifteen MHz frequency range, may be up to a meter or more in diameter, provide power transmission over a range of only a few meters, and only operate over a very narrow bandwidth.

In summary, transformer coupling is efficient but requires closely mounted coils, commonly with coils wound on a shared core. Inductive coupling is efficient with separation of transmit and receive coils on the order of millimeters to centimeters. Resonant inductive coupling extends the separation of transmit and receive coils to a meter or two, using physically large coils to reduce losses, and coils which have a very narrow bandwidth and are therefore operated at a fixed frequency.

What is needed is a way to increase the distance and efficiency in electromagnetic power transmission.

SUMMARY

In one embodiment is provided a device for power transmission comprising a primary conductive winding, and a resonant secondary magnetically coupled to the primary, the resonant secondary comprising a plurality of magnetic resonators, each magnetic resonator comprising a conductive winding and having a magnetic axis, the plurality of magnetic resonators electrically connected in series and with the magnetic axis of each of the plurality of magnetic resonators magnetically coupled to the primary.

In operation, a first power transmission device is configured as a transmitting device by coupling the device to a power source which injects alternating current power into the primary. A second power transmission device is configured as a power receiving device by coupling the primary of the receiving device to provide power to a load. In some embodiments a collector is coupled to the primary or secondary of either or both of the transmitting and receiving devices to improve efficiency. In some embodiments a return line is coupled between transmitting and receiving devices, connecting primaries or secondaries to improve efficiency.

The operating frequency of a system having a transmitting device and at least one receiving device powering a load is determined by sweeping the frequency of the alternating current supplied to the primary of the transmitting device through a range of frequencies including the resonant frequencies of both transmitting and receiving devices. In one embodiment, the frequency is determined by monitoring the voltage standing wave ratio (VSWR) between the power source and the primary of the transmitting device, selecting a frequency which minimizes the voltage standing wave ratio. In another embodiment, the frequency is determined by monitoring the power available at the receiving device, and selecting a frequency which maximizes the power available at the receiving device.

The operating frequency of a system having multiple receiving devices may change as devices are added. The operating frequency may be chosen to favor power transfer to one receiving device or a group of receiving devices over others. Multiple frequencies may be supplied to the transmitting device for supporting multiple groups of receiving devices from a single transmitting device.

Changes in the load on a receiving device are reflected in other receiving devices operating on the same frequency, and are reflected in the transmitter. Changing the load on a receiving device may be used as a signaling mechanism among receivers or between receiver and transmitter.

DETAILED DESCRIPTION

Described herein are various embodiments of an improved power transmission device comprising a primary winding magnetically coupled to a resonant secondary comprising a plurality of magnetic resonators electrically connected in series and arranged so that the magnetic axis of each magnetic resonator is in parallel with the magnetic axis of the primary winding. Each power transmission device has a self-resonant frequency.

In operation a power transmission device is used as a transmitting device, with an alternating current power source coupled to the primary winding of the transmitting device. One or more power transmission devices are used as receiving devices, with the primary winding of each receiving device coupled to deliver power to a load.

In different embodiments, a capacitor may be placed in parallel with the resonant secondary.

In different embodiments, a collector may be coupled to either or both of the transmitting and/or receiving devices.

In different embodiments, a return may be coupled to either or both of the transmitting and/or receiving devices.

Multiple receiving devices may be driven by a single transmitting device.

The operating frequency for the system comprising the transmitting device and one or more receiving devices is not necessarily the self-resonant frequency of the transmitting device or the receiving devices. In one embodiment, the operating frequency is determined by sweeping a range of frequencies including the self-resonant frequencies of the transmitting device and the receiving devices, selecting an operating frequency which minimizes reflected power from the transmitting device to the power source. This operating frequency may change with the number of receivers present. Different operating frequencies may be used to preferentially provide power to one or more receiving devices in a group. Multiple frequencies may be supplied to a transmitting device to support receiving devices operating on different frequencies.

Figure 1:
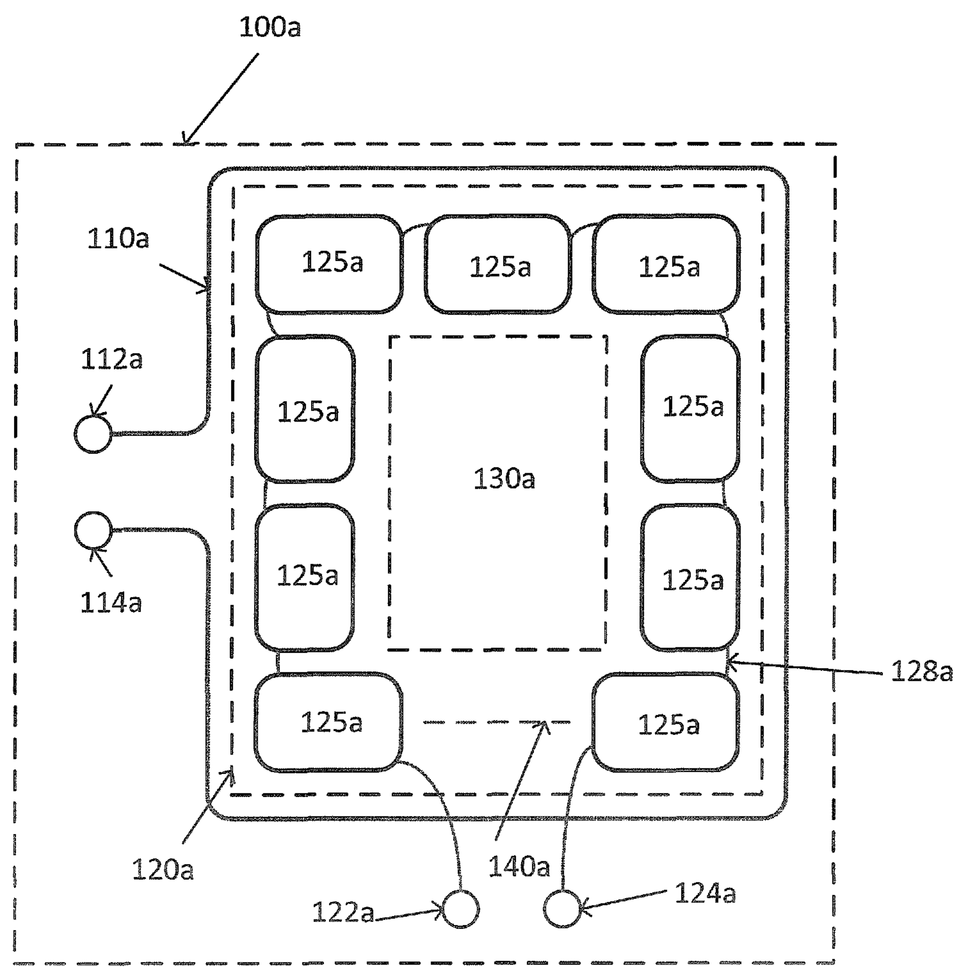
FIG. 1 is a diagram of a power transmission device according to an embodiment.

Referring now to FIG. 1, an embodiment of a power transmission device 100 in a top view is shown. Power transmission device 100*a* comprises a primary winding 110*a* connected to primary terminals 112 and 114. Primary winding 110*a* is magnetically coupled to a resonant secondary 120*a*. Resonant secondary 120*a* comprises a plurality of magnetic resonators 125*a*. As shown, in this embodiment each magnetic resonator 125*a* has a rectangular cross section. Primary 110*a* is wound around resonant secondary 120*a*. While schematically only one turn is shown for primary winding 110*a*, primary winding 110*a* typically comprises multiple turns.

Each magnetic resonator 125 comprises a winding; the plurality of magnetic resonators 125 are connected in series 128*a* and connected to secondary terminals 122 and 124. The plurality of magnetic resonators 125*a* are arranged so that the magnetic axis of each magnetic resonator 125*a* is in parallel with the magnetic axis of primary winding 110*a*.

It is understood by those in the art that for primary winding 110*a* to be magnetically coupled to resonant secondary 120*a*, primary winding 110*a* and each of the plurality of magnetic resonators 125*a* comprising resonant secondary 120*a* are wound and connected in phase. Each magnetic resonator 125*a* and the primary winding 110*a* are wound in helical fashion; each may be a single layer winding, or a multiple layer winding, one layer wound on top of the preceding layer. Other traditional winding techniques known to the solenoid and inductor arts may also be used. Magnetic resonators 125*a* are arranged, as shown, to enclose a central area 130. A split-ring configuration may be used in some embodiments, where a gap 140 exists between first and last magnetic resonators 125*b* connected in series.

A useful approximation is that the total length of the winding wire used to form the plurality of magnetic resonators 125 comprising resonant secondary 120 is one half the wavelength of the resonant frequency. Recall that the wavelength, usually shown as the Greek letter lambda (λ), is equal to the velocity of the speed of light divided by the frequency. As an example, for a frequency of 2 MHz, the wavelength is approximately 150 meters; half this wavelength is 75 meters, or 491 feet. This 75 meters of wire would be distributed over the number of individual magnetic resonators 125. As an example, in an embodiment using nine magnetic resonators 125, each magnetic resonator 125 would use approximately eight and one third meters of wire.

Figure 2:
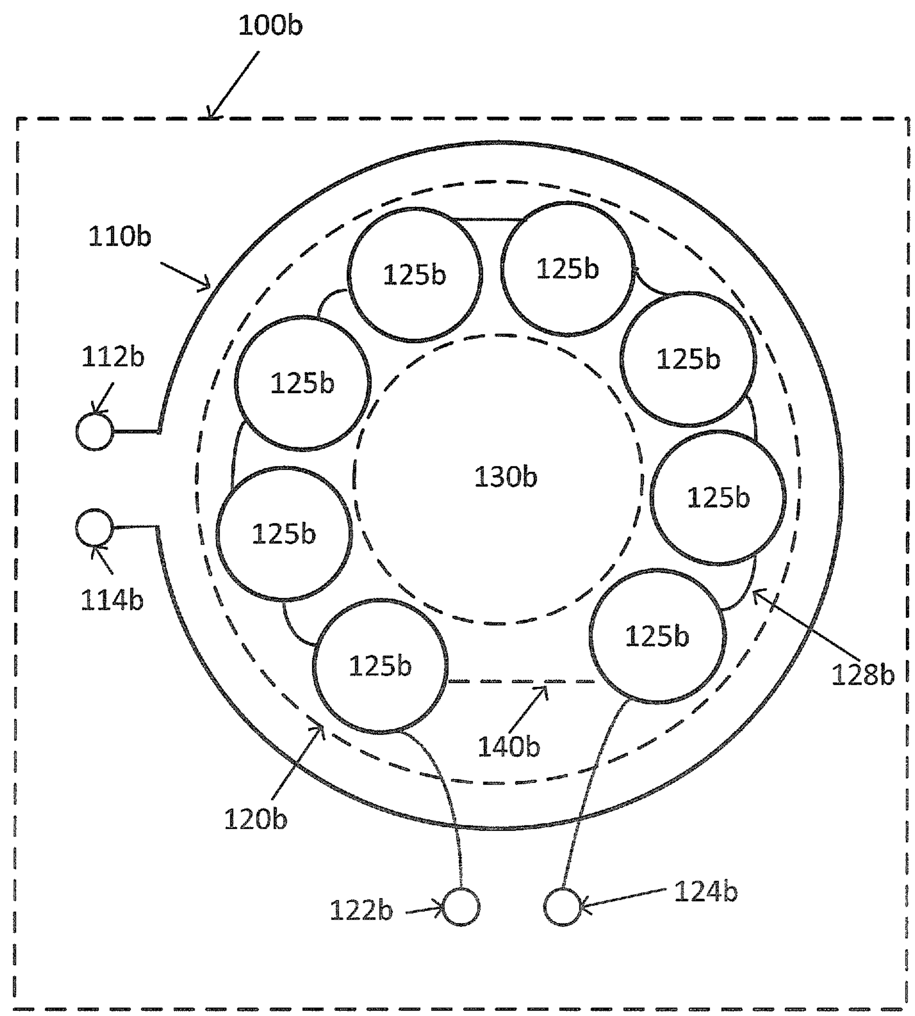
FIG. 2 is a diagram of a power transmission device according to another embodiment.

FIG. 2 shows an additional embodiment of power transmission device 100, again in top view. In this embodiment, magnetic resonators 125*b* have a circular cross section. As in FIG. 1, magnetic resonators 125*b* may enclose a central area 130*b*. A split-ring arrangement may be used, with a gap 140*b* between first and last magnetic resonators 125*b* connected in series.

In one embodiment, primary 110*b* is wound around the plurality of magnetic resonators 125*b*, for example, ten turns around the outer circumference of the plurality of magnetic resonators 125*b*.

In another embodiment, primary 110*b* is wound around each magnetic resonator 125*b* in series, for example, ten turns wound around a first magnetic resonator 125*b*, continuing to ten turns wound around a next magnetic resonator 125*b*, and so on for each of the plurality of magnetic resonators 125*b*.

Figure 3:
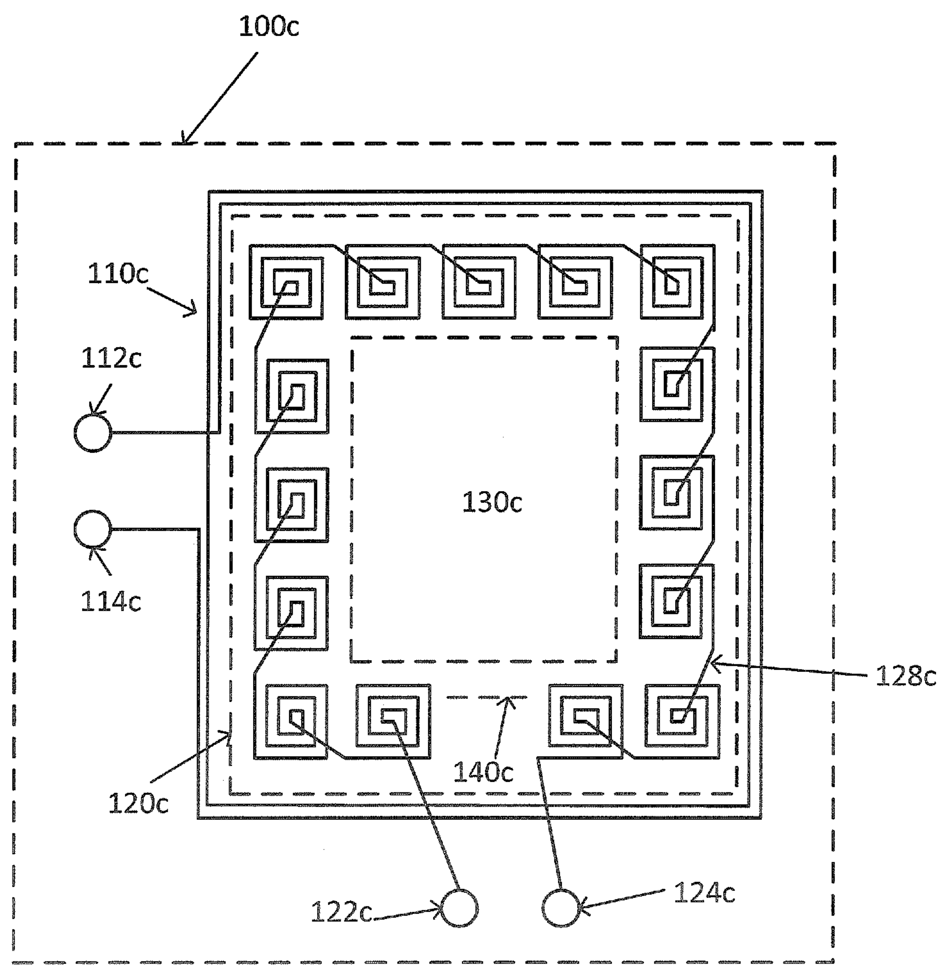
FIG. 3 is a diagram of a power transmission device according to another embodiment.

FIG. 3 shows an additional embodiment of power transmission device 100 suitable for implementation in a planar form, for example using printed circuit board fabrication techniques. As shown, magnetic resonator 125*c* is formed as a conductive trace for example on one side of a printed circuit board. While a rectangular trace is shown, a spiral trace may also be used. Connections 128*c* may be made for example using a wire extending out of the substrate containing the traces forming magnetic resonator 125*c*, or in the case of a multi-layer substrate, such as a double-sided printed circuit board, connections 128*c* are made using a conductive trace on the other side of the substrate from the conductive traces forming magnetic resonator 125*c*, connecting for example using plated-through vias as is known to the printed circuit board arts.

Primary winding 110*c* is similarly formed as a conductive trace on a substrate, such as the same substrate used for magnetic resonators 125*c*.

In some embodiments of FIG. 3, fabrication techniques used in multi-layer printed circuit boards may be used to extend magnetic resonators 125*c* and/or primary winding 110*c* through multiple layers of a mufti-layer printed circuit board by stacking multiple traces on top of each other, interconnected using vias and traces on other layers.

In some embodiments, a collector is coupled to either primary 110 or resonant secondary 120 of a power transmission device 100. In practice a collector is a generally flat conductive surface, such as a rectangular, square, or circular piece of conductive material such as a metal foil. In one embodiment, aluminum foil and Kevlar® backed aluminum foil have been used. In another embodiment, surfaces treated with a conductive coating, such as the spray-on EMI/RFI shielding carbon conductive coating, Catalog No. 838 from MG Chemicals may be used. Collector size is roughly inversely proportional to frequency, with larger collectors being used at low frequencies. Collector size varies from a few square inches to a few square feet. The collector is electrically coupled to the device by a wire. As explained in more detail elsewhere herein, an inductor may be used to couple the device and the collector. A single collector may be connected to multiple power receiving devices.

A collector connected to a power transmission device acts to broaden the frequency response of the device. The frequency response of the device may also be changed, for example, by placing a resistor across the secondary, that is, by connecting a resistor between the secondary terminals 122 and 124, which also broadens the response. Placing a capacitor across the secondary narrows the response, turning the secondary into a tuned circuit. Other resonating elements may also be used to shape the frequency response of the secondary, and by shaping the frequency of the secondary, shaping the frequency response of the overall power transmission device.

It is believed that the collector alters the permeability of the system. By tuning the size of the collector, and optionally adding an inductor in series with the collector and tuning the value of the inductor, the system permeability may be made to approach zero. Collector size and inductor value may be tuned by observing power transfer in a system and adjusting collector size and/or inductor value to increase power transfer, measured as power available at one or more receiving devices in the system.

Similarly, in some embodiments an electrical link forming a return couples the power transmitting device to one or more power receiving devices. The return may be a direct electrical link such as a wire between transmitting and receiving devices. A return may also be provided, for example, by the standard electrical power wiring in a facility, which provides a ground connection at each electrical outlet. An inductor may be placed between the device and the return, it is believed that the return alters the permittivity of the system, lowering the permittivity. An inductor in series with the return allows the permittivity to be further tuned, approaching zero. The value of the inductor may be selected by observing power transfer in a system, and adjusting inductor value to increase power transfer, measured as power available at one or more receiving devices in the system.

In one embodiment, two power transmission devices according to FIG. 2 were constructed in the same manner and labeled A and B. Resonant secondary 120 consists of six magnetic resonators 125. Each magnetic resonator consists of 13 turns of solid 30 gauge (30 AWG) Kynar® insulated wire in a single layer on a 0.5 inch diameter wood dowel form. The six resonators were spaced equally around a 1.25 inch diameter circle and connected in series. The magnetic resonator windings were wrapped with Kapton® tape. Primary 110 consists of six turns of solid 30 gauge Kynar® insulated wire wound on top of each magnetic resonator 125 in series.

Self-resonant frequencies for each device were determined using a calibrated HP 8594E Spectrum Analyzer with HP 85630A Scalar Test Set and HP 85714A Scalar Measurements Personality, producing the following data:

TABLE 1

| Scalar Measurements | | |
|---|---|---|
| Device | Resonance | Return Loss |
| A | 75.4 MHz | −3 dBm |
| | 67.5 MHz | −1.1 dBm |
| | 46.2 MHz | −1 dBm |
| | 39.5 MHz | 1.8 dBm |

TABLE 1-continued

| Scalar Measurements | | |
|---|---|---|
| Device | Resonance | Return Loss |
| B | 74.6 MHz | −2.8 dBm |
| | 65.4 MHz | −0.8 dBm |
| | 45.4 MHz | −0.8 dBm |
| | 38.8 MHz | −1.6 dBm |

The return loss is a measure of the impedance mismatch between a source device and a terminating load. A more negative value for return loss indicates a better impedance match between the source, in this case the Scalar Analyzer, and the terminating load, in this case the power transmission device. Return loss may also be thought of as a measure of how much power from the source is reflected back from the load and therefore unused. The more negative the return loss, the less power is being reflected from the load, and therefore more power is going to the load.

Figure 4:
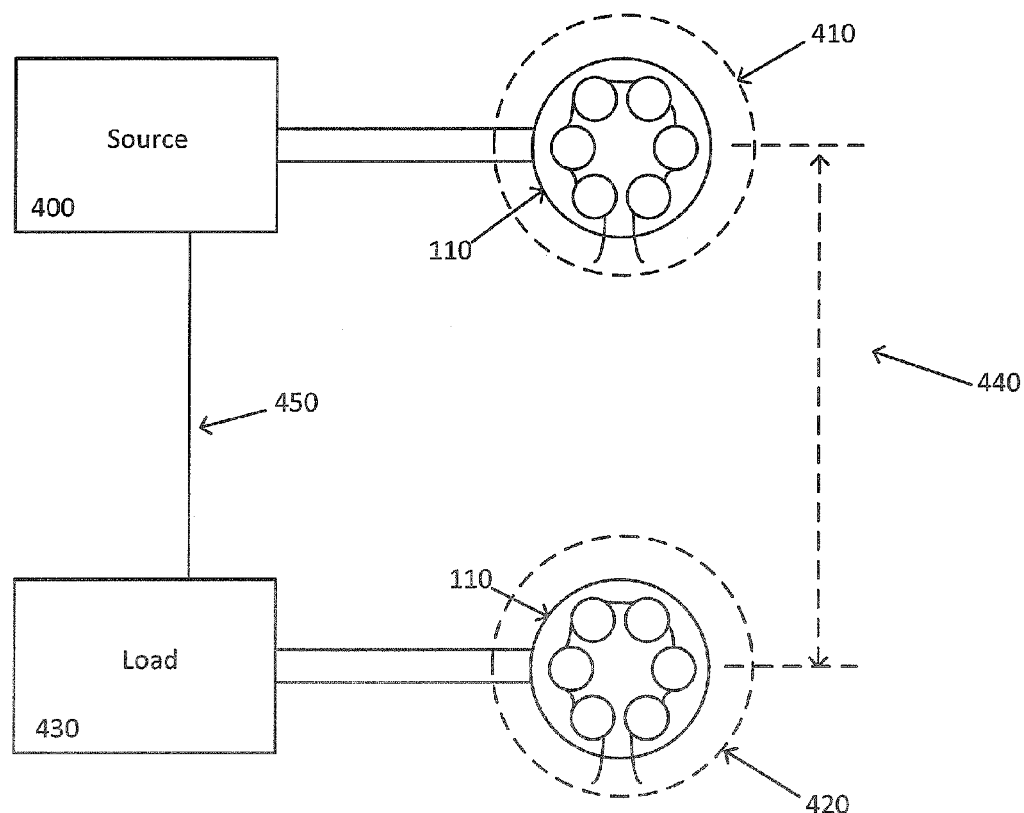
FIG. 4 is a diagram of a power transmission system according to an embodiment

Referring to FIG. 4, power transfer over distance was measured, using device A as power transmitting device 410, and device B as power receiving device 430. Measurements were first made without a return 450, and then with a return 450 electrically connecting the primary 110 of power transmitting device 410 to the primary 110 of power receiving device 420. The power source 400 used for these measurements was the tracking generator of the HP 8594E Spectrum Analyzer coupled through the HP 5630A Scalar Test Set, which produces a sine wave. Source power to transmitting device 410 was −10 dBm (0.10 milliWatts, or mW).

Power measurements without return 450 were made using a calibrated prototype battery-operated power meter as load 430, allowing power receiving device 420 and the power meter connected as load 430 to be floating, unconnected to other equipment. Power measurements with return 450 were made using the HP 8594E Spectrum Analyzer coupled through the HP 5630A Scalar Test Set, with the ground connection of the coaxial cables used to connect the Test Set to power transmitting device 410 and power receiving device 420, providing the return path from primary 110 of power transmitting device 410 to the primary 110 of power receiving device 420.

An operating frequency of 44.61 MHz was selected for the test by placing power transmitting device 410 and power receiving device 430 close to each other (approximately four inches separation), both devices connected to the Scalar Test Set, and selecting the frequency with the highest peak as displayed on the Spectrum Analyzer. Distance 440 was measured between the center of power transmitting device 410 and power receiving device 420. Power measurements were made as follows.

TABLE 2

| Power Transfer without Return and with Return | | |
|---|---|---|
| Distance Inches | without Return | with Return |
| 2 | −38 dBm | −32.4 dBm |
| 3 | −40.3 dBm | |
| 4 | −43.1 dBm | −33 dBm |
| 5 | −45.1 dBm | |
| 6 | −48.1 dBm | |
| 7 | −51 dBm | |
| 8 | −53 dBm | −33.6 dBm |
| 9 | −55 dBm | |
| 10 | −56 dBm | |

TABLE 2-continued

| Power Transfer without Return and with Return | | |
|---|---|---|
| Distance Inches | without Return | with Return |
| 11 | −58.4 dBm | |
| 12 | −60.2 dBm | |
| 16 | −65 dBm | −34.5 dBm |
| 18 | −66.8 dBm | |
| 32 | | −36.3 dBm |
| 40 | | −37 dBm |
| 64 | | −38.1 dBm |
| 80 | | −35.7 dBm |
| 128 | | −35.4 dBm |
| 160 | | −38.5 dBm |
| 276 | | −39.9 dBm |

Figure 5:
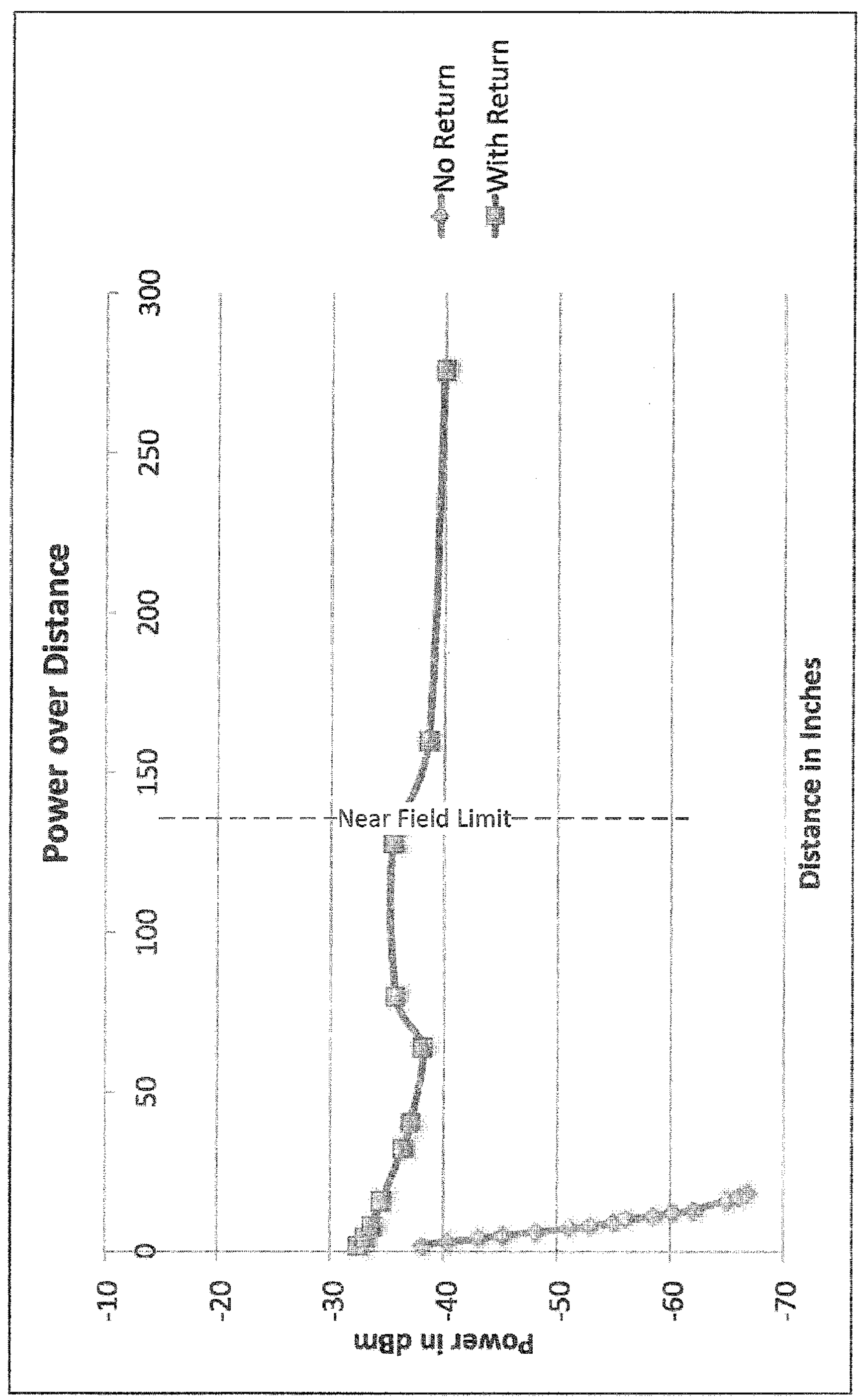
FIG. 5 is a graph of power transmission performance according to an embodiment.

This data is also shown in graphical form in FIG. 5. This data and the associated graph show the rapid falloff of power expected with resonant inductive coupling for the no return configuration.

Note that the decibel (dB) scale is a logarithmic scale; a change of approximately 3 dB represents a doubling of power. A change of 20 dB represents a hundred times increase in power. Similarly a change of −3 dB represents a halving of power, and a change of −20 dB represents one hundredth the power. The dBm scale uses a reference level (0 dB) of 1 milliWatt (mW) referenced to a 50 Ohm load.

In contrast, with an electrical link forming return 450 connecting the primary 110 of power transmitting device 410 and the primary 110 of power receiving device 420, power transfer is approximately level with distance.

It should be noted that the wavelength for a frequency of 44.61 MHz is 854 inches. The traditional limit of the near-field range for standard resonant inductive coupling is considered to be the wavelength (λ) divided by two Pi ($\lambda/2\pi$). For the frequency used, 44.61 MHz, this near-field limit is 136 inches, as shown on the graph of FIG. 5. The data in Table 2 as shown in the graph of FIG. 5 for a configuration with a return show approximately linear power transfer continuing past the near field limit, and measured at past twice this near field limit.

In another embodiment, four power transmission devices according to FIG. 1 were constructed. These devices were labeled A, B, C, and D. The overall dimensions of each of the four devices are 4 inches in width by 4 inches in length by 1.375 inches in height (101 mm×101 mm×35 mm). Primary winding 110 consists of 18 turns of 16 gauge insulated magnet wire. Resonant secondary 120 comprises nine magnetic resonators 125, each magnetic resonator 125 with dimensions of 1375 inches×0.5 inches×1.375 inches in height (35 mm×12.7 mm×35 mm). Each magnetic resonator 125 comprises 52 turns of 16 gauge insulated magnet wire wound in three layers. The nine magnetic resonators 125 are connected in series, with layers of Kapton® tape providing insulation between resonant secondary 120 and primary winding 110.

Each of these devices has a resonant frequency of approximately 2 MHz. This self-resonance arises from the combined length and inductance of the windings of magnetic resonators 125 and the distributed capacitance in these windings. It should be noted that these devices are physically small in relation to the frequency (2 MHz) and wavelength (150 meters).

Power transmission devices A, B, C, and D were tested to determine the self-resonant frequency and return loss of each device at its self-resonant frequency, with and without a collector attached to terminal 122 of resonant secondary 120. These tests were made using the HP 8549E Spectrum Analyzer with HP 85630A Scalar Test Set and HP 85714A Scalar Measurements Personality.

TABLE 3

| Scalar Measurements | | |
|---|---|---|
| Device | Resonant Frequency | Return Loss |
| A no collector | 2.180 MHz | −9.7 dB |
| A with collector | 2.075 MHz | −13.0 dB |
| B no collector | 2.213 MHz | −6.42 dB |
| B with collector | 2.083 MHz | −8.83 dB |
| C no collector | 2.163 MHz | −8.09 dB |
| C with collector | 2.068 MHz | −11.23 dB |
| D no collector | 2.133 MHz | −7.8 dB |
| D with collector | 2.043 MHz | −10.66 dB |

The data of Table 3 show that adding a collector to a device lowers its self-resonant frequency and decreases improves the return loss. In these tests, the collector was a square piece of Kevlar®backed aluminum foil approximately eight inches on a side, connected to the resonant secondary 120 of the device under test.

Figure 6:
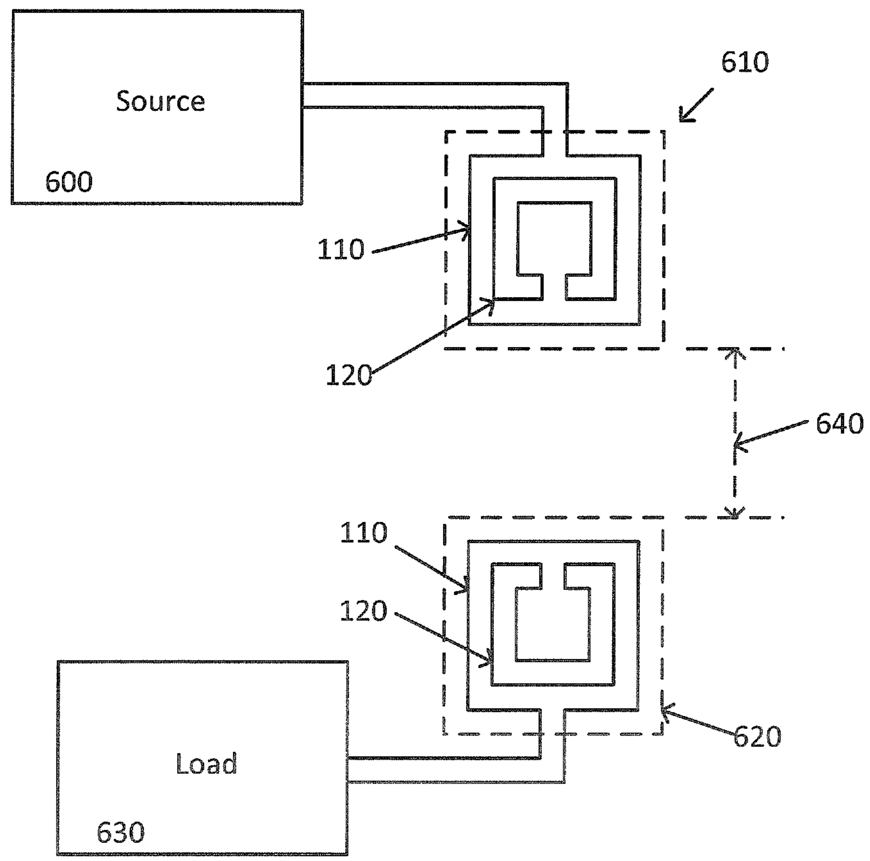
FIG. 6 is a diagram of a power transmission system according to an embodiment.
Figure 7:
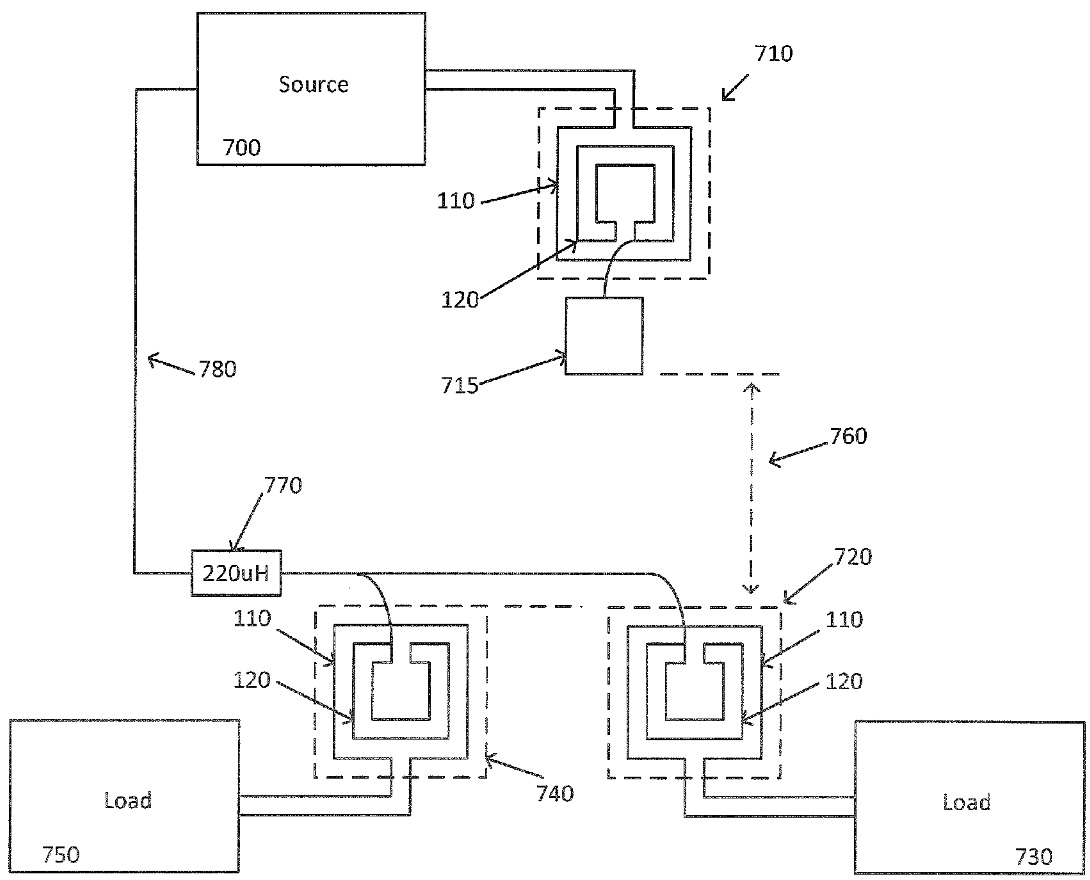
FIG. 7 is a diagram of a power transmission system according to another embodiment.

FIGS. 6 and 7 show test configurations using these devices to measure power transfer over distance. FIG. 6 shows the test setup for measuring power transfer over distance between two power transfer devices, without the use of collectors, FIG. 7 shows the test setup for measuring power transfer between power devices using a collector and a return. The results of these tests are shown in the graph of FIG. 8.

Figure 8:
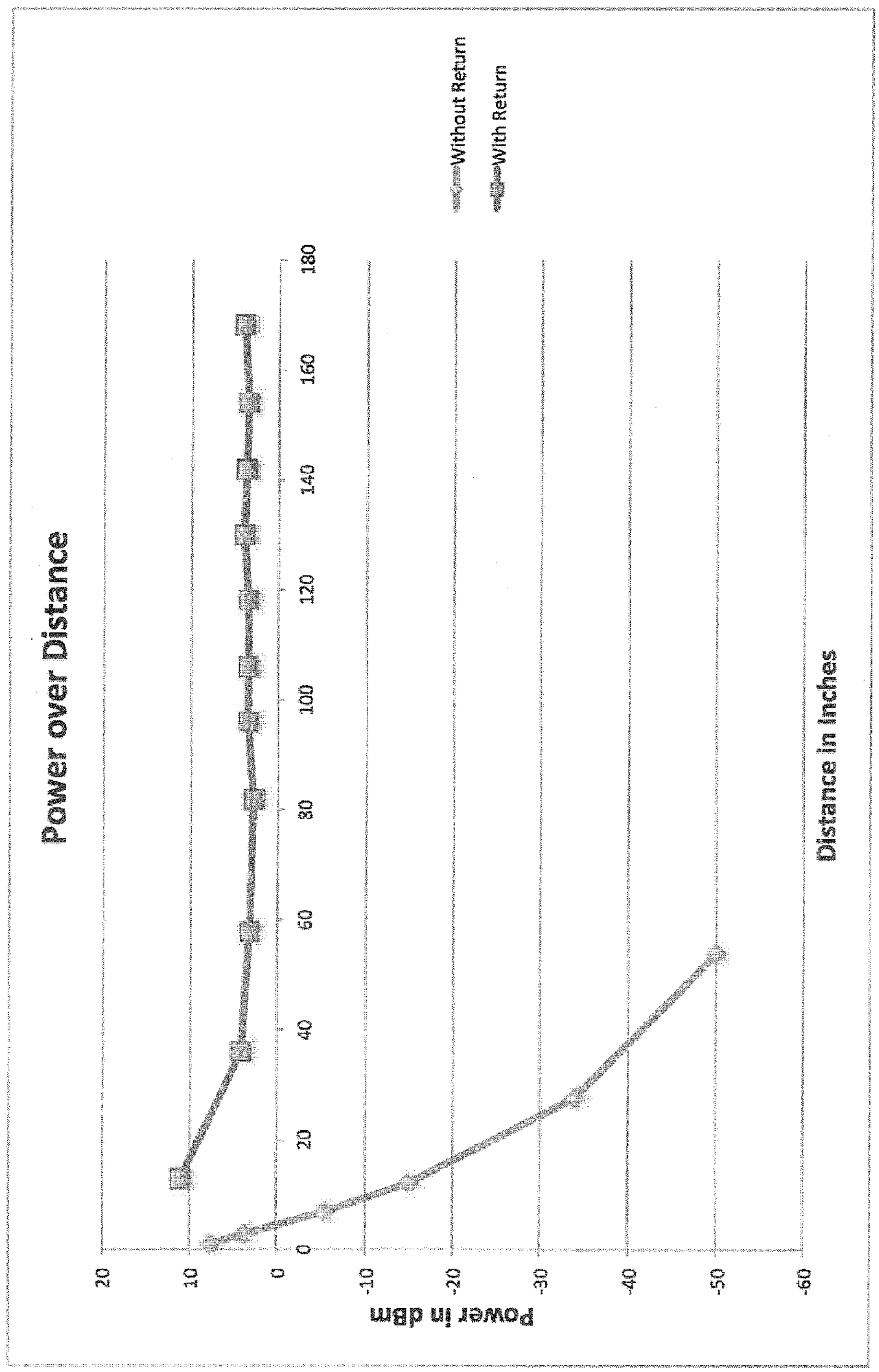
FIG. 8 is a graph of power transmission performance according to an embodiment.

The data for the "without return" line of FIG. 8 is generated by the test configuration shown in FIG. 6. Device A previously described is used as power transmitting device 610 and device C is used as power receiving device 620. In testing, power source 600 consists of an HP 3314A function generator producing a triangle wave driving a Verteq VPA 1987 Power Amplifier. Load 630 was an HP 8594E Spectrum analyzer, used for making measurements, connected to the primary 110 of receiving device 620. The Spectrum Analyzer provides a 50 Ohm load on the primary 110 of receiving device 620. Forward power from the amplifier to transmitting device 610 was approximately 50 watts, with return power approximately 8 watts. The operating frequency was 2.093 MHz, chosen to provide maximum measured output at receiving device 620. This operating frequency is different from the self-resonant frequencies of both devices. Measured power in dBm for various distances 640 between transmitting device 610 and receiving device 620 are shown in Table 4.

TABLE 4

| Receive Power in dBm as a Function of Distance (without return) | | |
|---|---|---|
| Dist inches | meters | Power dBm |
| 1 | 0.0254 | 7.5 |
| 3 | 0.0762 | 3.7 |
| 7 | 0.1778 | −5.3 |
| 12 | 0.3048 | −15 |
| 27.5 | 0.6985 | −34 |
| 54 | 1.3716 | −50 |

The measurements shown in Table 4 are in agreement with the rapid falloff of power associated with resonant inductive coupling.

FIG. 7 is a diagram of a power transmission system according to an embodiment. In this embodiment, transmitting device 710 has a collector 715 connected to terminal 122 of resonant secondary 120 of transmitting device 710. Power source 700 is the HP 3314A Function Generator and Verteq VPA 1987 Power Amplifier as used in the preceding test.

Multiple receiving devices 720 and 740 are used. Receiving device 720 has a high efficiency red light emitting diode (LED) connected to its primary as load 730. Receiving device 740 is connected to the HP 8594E Spectrum Analyzer as load 750 for measurements, providing a 50 Ohm load to the primary 110 of receiving device 740. As shown resonant secondaries 120 of receiving devices 720 and 740 are connected together and coupled through a 220 microHenry (μH) inductor 770 to the case grounds of the HP 5514A signal generator and the Verteq VPA 1987 Power Amplifier, and to the primary 110 of transmitting device 710, thus providing a return. The other terminal of the resonant secondaries for transmitting device 710 and receiving devices 720 and 740 are unconnected.

An operating frequency of 2.093 MHz was selected as providing best power transfer from transmitting device 710 to receiving devices 740 and load 750. During measurements, the LED used as load 730 for receiving device 720 was illuminated by power received from transmitting device 710.

Receive power as a function of distance 760 between collector 715 on transmitting device 710 and receiving devices 720 and 740 in this configuration is shown in Table 5.

TABLE 5

| Receive Power in dBm as a Function of Distance (with return) | | |
|---|---|---|
| Dist inches | meters | Power dBm |
| 13 | 0.3302 | 11 |
| 36 | 0.9144 | 4.05 |
| 58 | 1.4732 | 3.1 |
| 82 | 2.0828 | 2.76 |
| 96 | 2.4384 | 3.4 |
| 106 | 2.6924 | 3.5 |
| 118 | 2.9972 | 3.5 |
| 130 | 3.302 | 4 |
| 142 | 3.36068 | 3.68 |
| 154 | 3.9116 | 3.4 |
| 168 | 4.2672 | 3.84 |

The measurements in Table 5 show constant power transfer scaling with distance, shown as the "with return" line of the graph of FIG. 8. This is in stark comparison to the rapidly nonlinearly diminishing power transfer shown in Table 4, and the "without return" line of the graph of FIG. 8.

The embodiment of FIG. 7 shows one transmitting device providing power to two receiving devices simultaneously. This embodiment shows a transmitting device with a collector coupled to the secondary. This embodiment shows two receiving devices coupled to a common return through an inductor.

Additional embodiments show this constant power scaling with range such as shown in Table 4.

In another embodiment, a pair of power transmission devices according to FIG. 1 were constructed. The resonant secondary 120 of each device comprises 17 magnetic resonators 125. Each magnetic resonator 125 is 44 turns of 16 AWG magnet wire wound in two layers on a form measuring 1.5 inches wide by 0.75 inches long by 1.5 inches in height.

These magnetic resonators 125 are arranged in a generally square form with a gap between first and last magnetic resonators. The resonant secondary was covered with Kapton® tape to provide insulation between primary and secondary, and wound with the primary 110, 16 turns of 16 AWG magnet wire. The overall size of each device is 8 inches long by 8 inches deep and 1.5 inches high.

Self-resonant frequencies and return loss were determined for each device. The transmitting device showed a self-resonant frequency of 1.63 MHz with a return loss of −3.95 dB without a collector, and 1.51 MHz with a return loss of −2.75 dB with a collector. The receiving device measured a self-resonant frequency of 1.34 MHz with a return loss of −6.2 dB without a collector, and 1.27 MHz with a return loss of −7.11 dB with a collector Power transfer was measured using the embodiment of FIG. 9. Power source 900 was the HP 5514A signal generator and Verteq VPA 1987 Power Amplifier, coupled to primary 110 of transmitting device 910. Measured drive power was 27.5 dBm at 1.490 MHz, as measured using the portable RF power meter connected to the Power Amplifier output through a precision 20 dB power attenuator. A collector 915 was connected to resonant secondary 120 of transmitting device 910. Collector 915 was a circular cardboard disc approximately one foot in diameter, coated with a spray-on EMI/RFI shielding carbon conductive coating as described previously herein.

Primary 110 of receiving device 920 was coupled to the portable RF power meter as load 930. A return 940 connected from the primary 110 of transmitting device 910 to the primary 110 of receiving device 920 comprising a length of 30 AWG solid Kynar® insulated wire was also used. A collector 926 was also coupled to the secondary 120 of receiving device 920 through a 100 microhenry inductor 926. Collector 926 was a small aluminum sheet metal plate approximately 8 inches by 16 inches.

Figure 9:
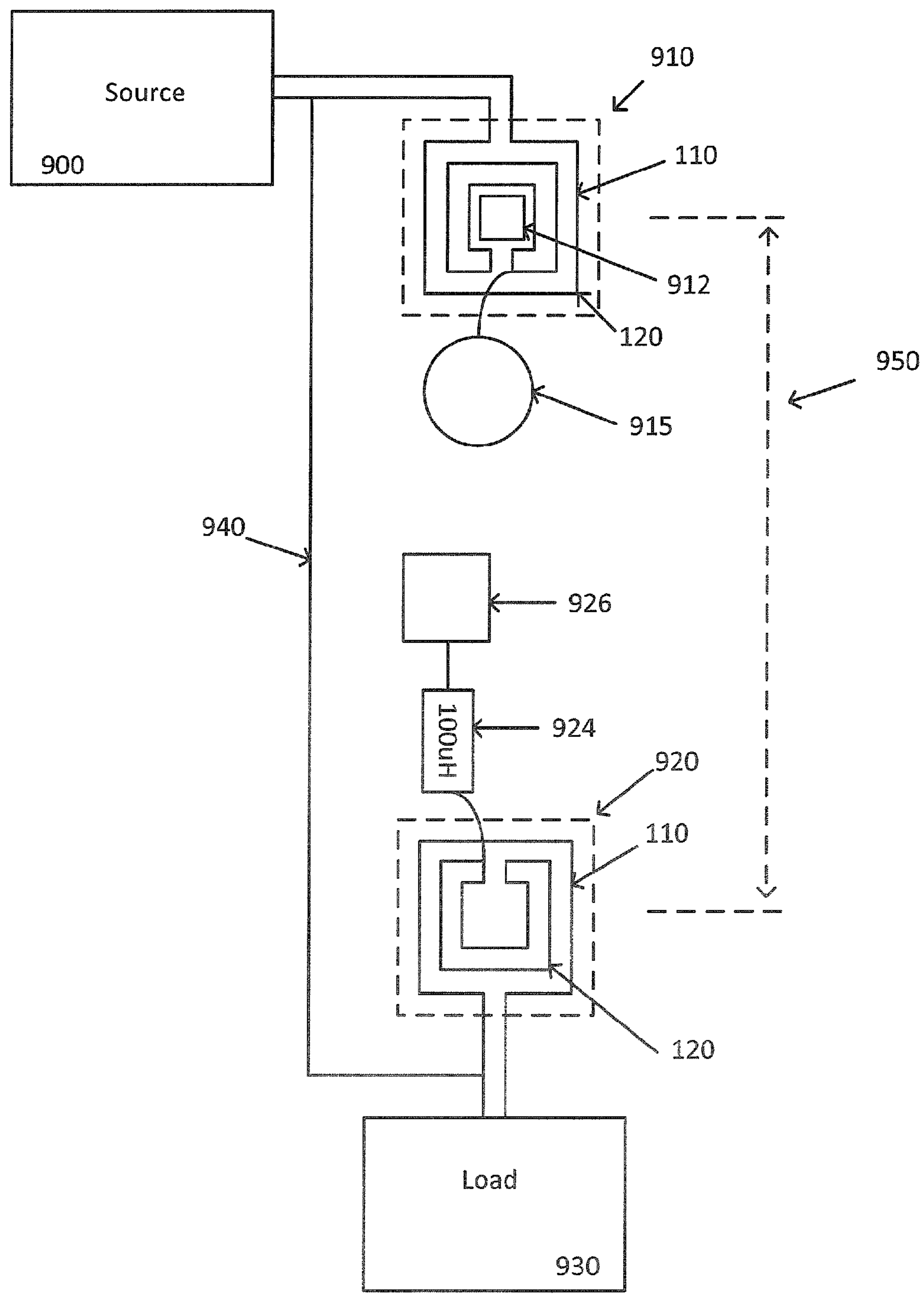
FIG. 9 is a diagram of a power transmission system according to an embodiment.

During testing, a metal ring 912 consisting of a piece of 1½ inch wide adhesive-backed aluminum tape was placed inside resonant secondary 120 of transmitting device 910. In the configuration of FIG. 9 without collectors 915 and 926 in place, a power level of 5.6 dBm was measured at receiving device 920 without ring 912 present. Placing ring 912 into transmitting device 910 increased the power measured at receiving device 920 to 77 dBm, an increase of 1.1 dBm.

Distance testing was performed outdoors on an asphalt surface. With a power input of 273 dBm at 1345 MHz to transmitting device 910, the power levels measured at receiving device 920 over distance are as shown.

TABLE 6

Receive Power over Distance (with return and collectors)

| Distance Feet | Receive Power dBm |
|---|---|
| 4 | 13.7 dBm |
| 11 | 12.8 dBm |
| 32.5 | 13.0 dBm |
| 81 | 13.4 dBm |

This shows the constant power transfer scaling with distance consistent with other embodiments.

The effect of inductor 924 coupling collector 926 to the secondary 120 of receiving device 920 was readily apparent in this test. With inductor 924 in place coupling collector 926 to the secondary 120 of receiving device 920, measured power was 13.4 dBm at a distance of 81 feet. Removing inductor 924 and connecting collector 926 directly to the secondary 120 of receiving device 920 reduces the receive power at the same distance to 8.6 dBm, a loss of 3.8 dB.

Testing also demonstrated that the collector may be coupled to the resonant secondary at other than terminals 122 and 124, the ends of the resonant secondary. For example, the collector may be coupled to the resonant secondary at the connection between a pair of magnetic resonators 125.

Note that in the testing described herein, no attempt was made to match the output impedance of the power sources used, 50 Ohms in each case, to the impedance of the transmitting device at the operating frequency chosen. Proper impedance matching is expected to increase efficiency and overall power transfer. As examples, a return loss of −3 dB corresponds to a power loss of 50% between the power source and the transmitting device. A return loss of −6 dB corresponds to a power loss of 25% between the power source and the transmitting device. Similarly, no impedance matching was done between the primary of the receiving device and the load on the receiving device. Load devices such as the Spectrum Analyzer and portable RF power meter present a 50 Ohm load to the receiving device. Loads such as incandescent lamps and light emitting diodes (LEDs) present more complex loads, particularly in the case of LEDs. Proper impedance matching should improve efficiency and overall power transfer.

Different waveforms may be used to drive the transmitting device. The tests described herein were performed using a combination of sine waves, square waves, and triangle waves as drive signals. Recall that a square wave is the sum of a fundamental frequency and the odd harmonics of the fundamental; a triangle wave is also the sum of a fundamental frequency and odd harmonics, but with a faster rolloff than in the case of a square wave.

A combination or sum of drive signals may also be fed to a transmitting device. As an example, a first signal generator generating a drive signal at 1.9 MHz, and a second signal generator generates a drive signal at 2.1 MHz. These two drive signals are added and fed to the input of the power amplifier, which is coupled to the primary of the transmitting device. Each drive signal powers a group of receiving devices.

It has been learned that when a transmitting device and one or more receiving devices are operated together, they operate as a system. The operating frequency of this system is not necessarily the self-resonant frequency of any of the individual devices. In one embodiment, an operating frequency is determined by sweeping a range of frequencies including the self-resonant frequencies of the devices in the system while measuring forward and reverse power from the power source to the transmitting device. An operating frequency will have a low ratio of reverse to forward power. There may be more than one such frequency within a frequency range. As an example, with a transmitting device having a self-resonant frequency of 1.6 MHz, and a group of receiving devices having self-resonant frequencies in the neighborhood of 2 MHz, sweeping from 2.1 MHz down to 1.5 MHz while monitoring the ratio of reverse to forward power will identify one or more operating frequencies. In another embodiment, the frequency sweep is made at a low power level, with power increased once an operating frequency has been selected.

When loads presented by individual receiving devices change, or more receiving devices and loads are added to the system, the overall system resonance changes. This change alters the ratio of reverse to forward power measured at the transmitting device, and also changes the power level present at other receiving devices. One embodiment uses this detected change at the transmitting device to initiate a search for a possibly better operating frequency. In another embodiment, receiving devices use shifts in load to signal the transmitting device and/or other receiving devices, for example toggling a load to send serial data to another device.

We hypothesize that the transmitting and receiving device embodiments described herein implement a metamaterial lens with effective permittivity and/or permeability approaching zero or equal to zero. This hypothesis is derived using transformation optics techniques. The derivation considers two spaces, physical space and electromagnetic space. Physical space is the space within which the devices are physically present. Electromagnetic space is the space perceived by the electromagnetic energy present in the system. The derivation shows that points separated in physical space are made approximately coincident in electromagnetic space by using devices with effective permittivity and permeability approaching zero or equal to zero. This coincidence in electromagnetic space allows for efficient power transfer. The design of the devices described herein was informed by this theory.

It is to be understood that the examples given are for illustrative purposes only and may be extended to other implementations and embodiments with different conventions and techniques. While a number of embodiments are described, there is no intent to limit the disclosure to the embodiment(s) disclosed herein. On the contrary, the intent is to cover all alternatives, modifications, and equivalents apparent to those familiar with the art.

In the foregoing specification, the invention is described with reference to specific embodiments thereof, but those skilled in the art will recognize that the invention is not limited thereto. Various features and aspects of the herein-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms “comprising,” “including,” and “having,” as used herein, are specifically intended to be read as open-ended terms of art.

We claim:

1. A device for power transmission comprising:

a primary comprising a conductive winding, a collector coupled to only one terminal of the primary, and a resonant secondary having a resonant frequency, the resonant secondary magnetically coupled to the primary, the resonant secondary comprising:

a plurality of magnetic resonators, each magnetic resonator comprising a conductive winding and having a magnetic axis, the plurality of magnetic resonators connected in series, with the magnetic axis of each of the plurality of magnetic resonators magnetically coupled to the primary.

2. The device of claim 1 where the primary is adapted to be coupled to a power source.

3. The device of claim 1 where the primary is adapted to be coupled to a load.

4. The device of claim 1 where the combined length of the windings of the plurality of magnetic resonators comprising the resonant secondary is approximately half the wavelength of the resonant frequency of the resonant secondary.

5. The device of claim 1 where the plurality of magnetic resonators are arranged to enclose a circular area.

6. The device of claim 1 where the plurality of magnetic resonators are arranged to enclose a rectangular area.

7. The device of claim 1 where the primary winding is helical.

8. The device of claim 1 where the magnetic resonators are helical.

9. The device of claim 1 where the primary winding is formed on a planar substrate.

10. The device of claim 1 where the magnetic resonators are formed on a planar substrate.

11. The device of claim 10 where the primary winding is coplanar with the magnetic resonators.

12. The device of claim 1 where the primary winding is wound around the resonant secondary.

13. The system of claim 1 wherein the magnetic axis of each magnetic resonator is parallel to a magnetic axis of the primary.

14. A device for power transmission comprising:

a primary comprising a conductive winding, a resonant secondary having a resonant frequency, the resonant secondary magnetically coupled to the primary, the resonant secondary comprising:

a plurality of magnetic resonators, each magnetic resonator consisting of a conductive winding and having a magnetic axis, the plurality of magnetic resonators connected in series, with the magnetic axis of each of the plurality of magnetic resonators magnetically coupled to the primary;

and a collector coupled to only one terminal of the secondary.

15. The device of claim 14 where the primary is adapted to be coupled to a power source.

16. The device of claim 14 where the primary is adapted to be coupled to a load.

17. The device of claim 14 where the combined length of the windings of the plurality of magnetic resonators comprising the resonant secondary is approximately half the wavelength of the resonant frequency of the resonant secondary.

18. The device of claim 14 where the plurality of magnetic resonators are arranged to enclose a circular area.

19. The device of claim 14 where the plurality of magnetic resonators are arranged to enclose a rectangular area.

20. The device of claim 14 where the primary winding is helical.

21. The device of claim 14 where the magnetic resonators are helical.

22. The device of claim 14 where the primary winding is formed on a planar substrate.

23. The device of claim 14 where the magnetic resonators are formed on a planar substrate.

24. The device of claim 23 where the primary winding is coplanar with the magnetic resonators.

25. The device of claim 14 where the primary winding is wound around the resonant secondary.

26. A system for transferring power between a power source operating at a frequency and a load, comprising:

a power transmission device comprising:

a transmit primary comprising a conductive winding, the transmit primary coupled to the power source, a resonant transmit secondary haying a resonant frequency, the resonant secondary magnetically coupled to the transmit primary, the resonant transmit secondary comprising:

a plurality of transmit magnetic resonators, each transmit magnetic resonator comprising a conductive winding and having a magnetic axis, the plurality of transmit magnetic resonators connected in series, with the magnetic axis of each of the plurality of transmit magnetic resonators magnetically coupled to the transmit primary, a power reception device comprising:

a receive primary comprising a conductive winding, the receive primary coupled to a load, a resonant receive secondary having a resonant frequency, the resonant receive secondary magnetically coupled to the receive primary, the resonant receive secondary comprising:

a plurality of receive magnetic resonators, each receive magnetic resonator comprising a conductive winding and having a magnetic axis, the plurality of receive magnetic resonators connected in series, with the magnetic axis of each of the plurality of receive magnetic resonators magnetically coupled to the receive primary, and a collector coupled to only one terminal of the power transmission device.

27. The system of claim 26 further including an inductor coupling the collector to the power transmission device.

28. The system of claim 27 where the inductor is selected to minimize permeability of the system.

29. The system of claim 26 further comprising an electrical link coupling the power transmission device to the power reception device.

30. The system of claim 29 where the electrical link further includes an inductor.

31. The system of claim 30 where the inductor is selected to minimize system permittivity.

32. The system of claim 26 where the magnetic axis of each of the plurality of transmit magnetic resonators is parallel to a magnetic axis of the transmit primary and wherein the magnetic axis of each of the plurality of receive magnetic resonators is parallel to a magnetic axis of the receive primary.

33. A system for transferring power between a power source operating at a frequency and a load, comprising:

a power transmission device comprising:

a transmit primary comprising a conductive winding, the transmit primary coupled to the power source, a resonant transmit secondary having a resonant frequency, the resonant secondary magnetically coupled to the transmit primary, the resonant transmit secondary comprising:

a plurality of transmit magnetic resonators, each transmit magnetic resonator consisting of a conductive winding and having a magnetic axis, the plurality of transmit magnetic resonators connected in series, with the magnetic axis of each of the plurality of transmit magnetic resonators magnetically coupled to the transmit primary, a power reception device comprising:

a receive primary comprising a conductive winding, the receive primary coupled to a load, a resonant receive secondary having a resonant frequency, the resonant receive secondary magnetically coupled to the receive primary, the resonant receive secondary comprising:

a plurality of receive magnetic resonators, each receive magnetic resonator consisting of a conductive winding and having a magnetic axis, the plurality of receive magnetic resonators connected in a series, with the magnetic axis of each of the plurality of receive magnetic resonators magnetically coupled to the receive primary, and a collector coupled to only one terminal of the power reception device.

34. The system of claim 33 further including an inductor coupling the collector to the power reception device.

35. The system of claim 34 where the inductor is selected to minimize permeability of the system.

36. The system of claim 33 further comprising an electrical link coupling the power transmission device to the power reception device.

37. The system of claim 36 where the electrical link further includes an inductor.

38. The system of claim 37 where the inductor is selected to minimize system permittivity.

* * * * *